United States Patent [19]
Cowan

[11] Patent Number: 5,918,924
[45] Date of Patent: Jul. 6, 1999

[54] MOBILE MULTI-MESSAGE BILLBOARD ADVERTISING SYSTEM

[76] Inventor: Delroy Cowan, 19500 East St. Andrews Dr., Miami, Fla. 33015

[21] Appl. No.: 08/721,360

[22] Filed: Sep. 26, 1996

[51] Int. Cl.[6] .................................................. B60R 13/00
[52] U.S. Cl. .............................................. 296/21; 40/591
[58] Field of Search ............................... 296/21; 362/80; 40/590, 591, 545, 502, 473, 493

[56] References Cited

U.S. PATENT DOCUMENTS

| | | | |
|---|---|---|---|
| 649,622 | 5/1900 | Uting | 40/590 |
| 676,235 | 6/1901 | Jackson | 40/590 X |
| 2,356,690 | 8/1944 | Perkins | 296/183 |
| 3,135,063 | 6/1964 | Ricks | 40/473 |
| 5,083,826 | 1/1992 | McCrary | 296/21 |
| 5,416,996 | 5/1995 | Clemons et al. | 40/502 |

FOREIGN PATENT DOCUMENTS

| | | | |
|---|---|---|---|
| 1001801 | 2/1952 | France | 40/473 |
| 1057266 | 3/1954 | France | 40/545 |
| 2683658 | 5/1993 | France | 40/473 |
| 845439 | 7/1952 | Germany | 296/21 |

*Primary Examiner*—Dennis H. Pedder
*Attorney, Agent, or Firm*—Michael I. Kroll

[57] ABSTRACT

A mobile multi-message billboard advertising system (10) comprising a truck (12) having a wheel-supported cab (14) and chassis (16). A superstructure (18) is mounted onto the chassis (16) of the truck (12). A plurality of tri-visional action display units visional action display units (20) are affixed to the superstructure (18). A facility (22) on the superstructure (18) is for illuminating the tri-visional action display units (20), so that advertisements (24) can be seen thereon.

1 Claim, 6 Drawing Sheets

MOBILE MULTI-MESSAGE BILLBOARD ADVERTISING SYSTEM

BACKGROUND OF THE INVENTION

1. Field of the Invention

The instant invention relates generally to vehicle display devices and more specifically it relates to a mobile multi-message billboard advertising system.

2. Description of the Prior Art

Numerous vehicle display devices have been provided in prior art. For example, U.S. Pat. Nos. 1,063,010 to Concannon; 5,005,893 to McCrary; 5,294,833 to Kobayashi and 5,415,451 to Stanton all are illustrative of such prior art. While these units may be suitable for the particular purpose to which they address, they would not be as suitable for the purposes of the present invention as heretofore described.

An advertising apparatus involving an upright body or frame. Parallel rotatable shafts are mounted in the top and bottom portions thereof. The sides of the body or frame are provided with vertical panels. A plurality of endless belt devices are mounted on the shafts and correspond in number with the panels. Horizontally arranged advertising members are movable connected with the endless belt devices and move vertically through the panels and around the shafts. Housings have openings in the front thereof and movable plates are placed in the housings. One side face of which is provided ith two rows of advertisements reversely arranged. The plates are movable laterally in the housings through a space the width of which is approximately the same as the transverse width of one of the advertisements and of the openings in the front of the housings.

A mobile promotional vehicle includes a tractor cab having an elongated, substantially horizontally extending bed connected thereto. An information display superstructure extends upwardly from the bed and includes outwardly leaning side walls which diverge upwardly, and converge as they process from the rear of the bed forwardly in the direction of the cab. These side walls are joined by a horizontal, trapezoidally-shaped top wall, and by vertically extending, trapezoidally-shaped forward and rear walls. This allows the outer surface of the side walls to be better illuminated and more visible. Multiple display panels are stored inside the side walls and can be quickly transferred to an exposed, display position in juxtaposition to the outer surface of the side walls.

An on-vehicle display device mounted on the bed of a vehicle has a display screen unit which is vertically divided into at least three screens. When the display device is housed, the display screens are disposed in parallel with each other. When the display device is constructed, one of the display screens is moved to the uppermost position, and another is moved to the lowermost position by a horizontal extension hydraulic unit. The remaining screen is moved to an intermediate position by a diagonal extension hydraulic unit, to obtain a very large screen.

A mounting system and method allows standard billboard panels to be mounted onto the side of a commercial semi-trailer or the like. A lower retaining channel and an upper retaining channel form a track into which billboard panels are inserted and retained. Removable end channels prevent the panels from sliding out of the track. The panels are secured together by tongue and groove joints and fasteners which are inserted through apertures in adjoining panels. The panels are covered with either paid commercial advertisements similar to a conventional billboard, or with the trailer owner's own name, insignia, advertising, or the like.

SUMMARY OF THE INVENTION

A primary object of the present invention is to provide a mobile multi-message billboard advertising system that will overcome the shortcomings of the prior art devices.

Another object is to provide a mobile multi-message billboard advertising system that utilizes tri-visional display units which are capable of displaying a plurality of different messages sequentially, whereby the movement of the tri-visional action display units will draw attention to the messages advertised.

An additional object is to provide a mobile multi-message billboard advertising system in which extra large displays that are very visible on a truck, can be taken to special events, busy streets, shopping malls, etc. to allow many people to see these extra large displays illuminated thereon.

A further object is to provide a mobile multi-message billboard advertising system that is simple and easy to use.

A still further object is to provide a mobile multi-message billboard advertising system that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DETAILED DESCRIPTION OF THE PREFERRED EMBODIMENTS

Figure 1:
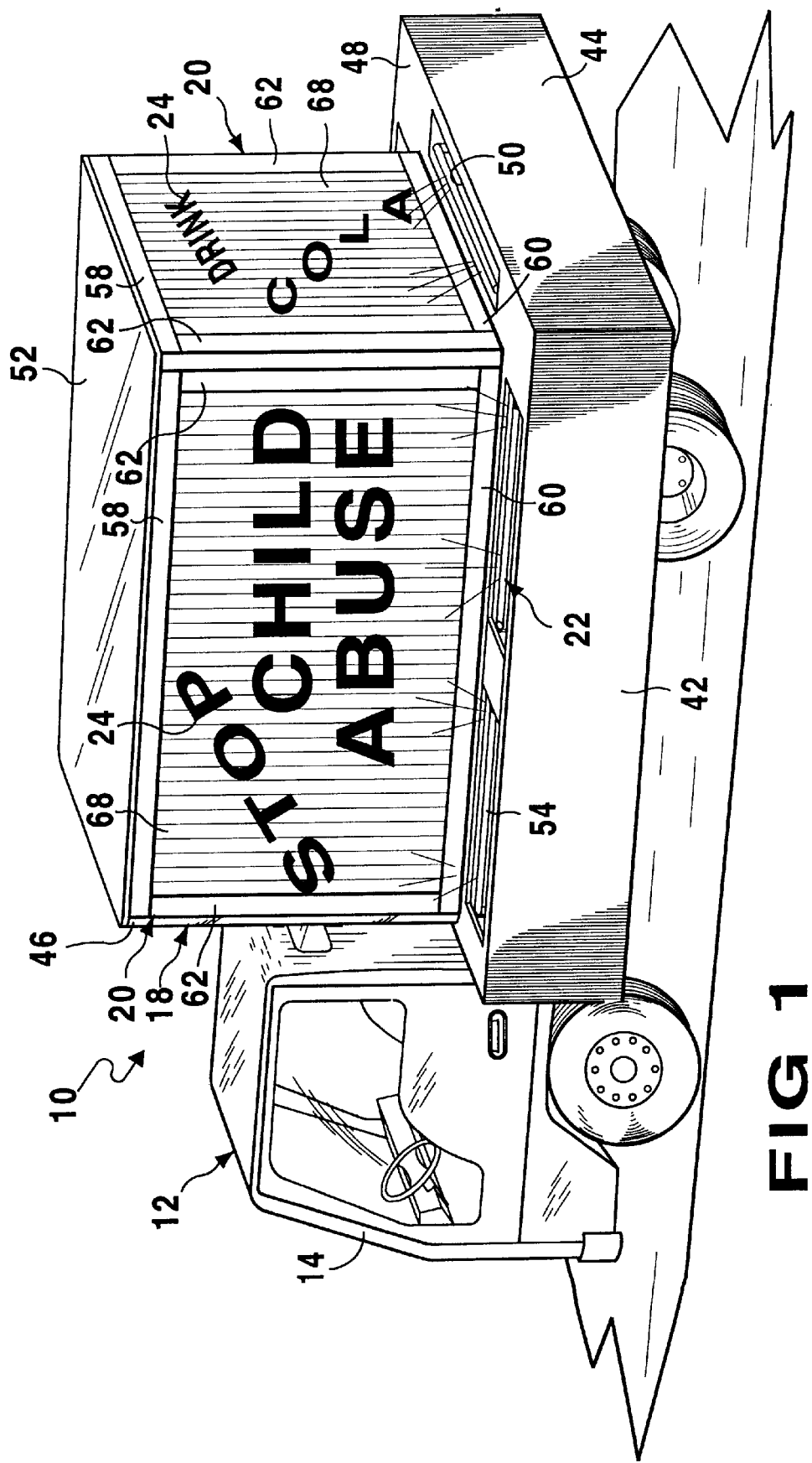
FIG. 1 is a perspective view of the instant invention.
Figure 2:
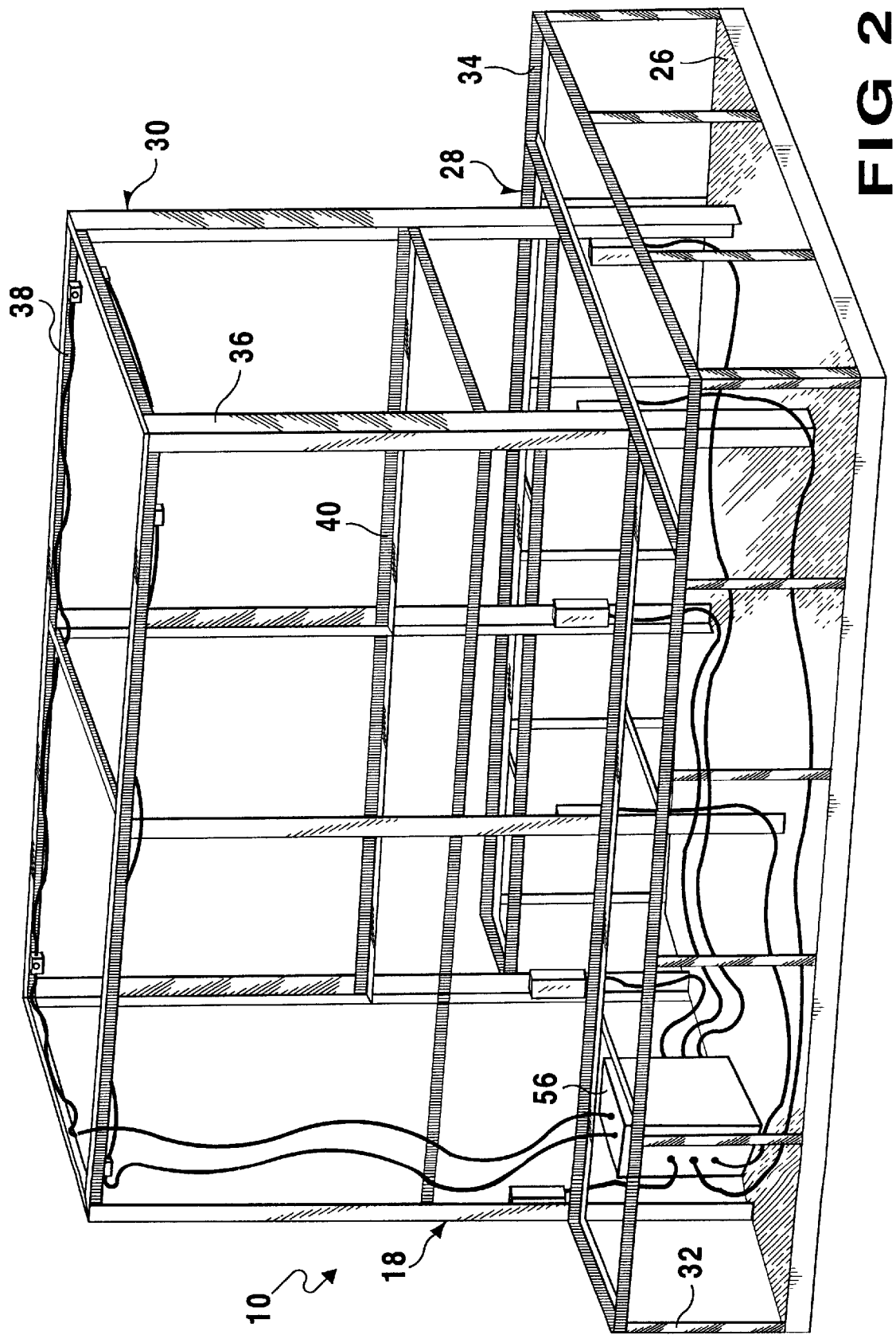
FIG. 2 is a perspective view of the superstructure.
Figure 3:
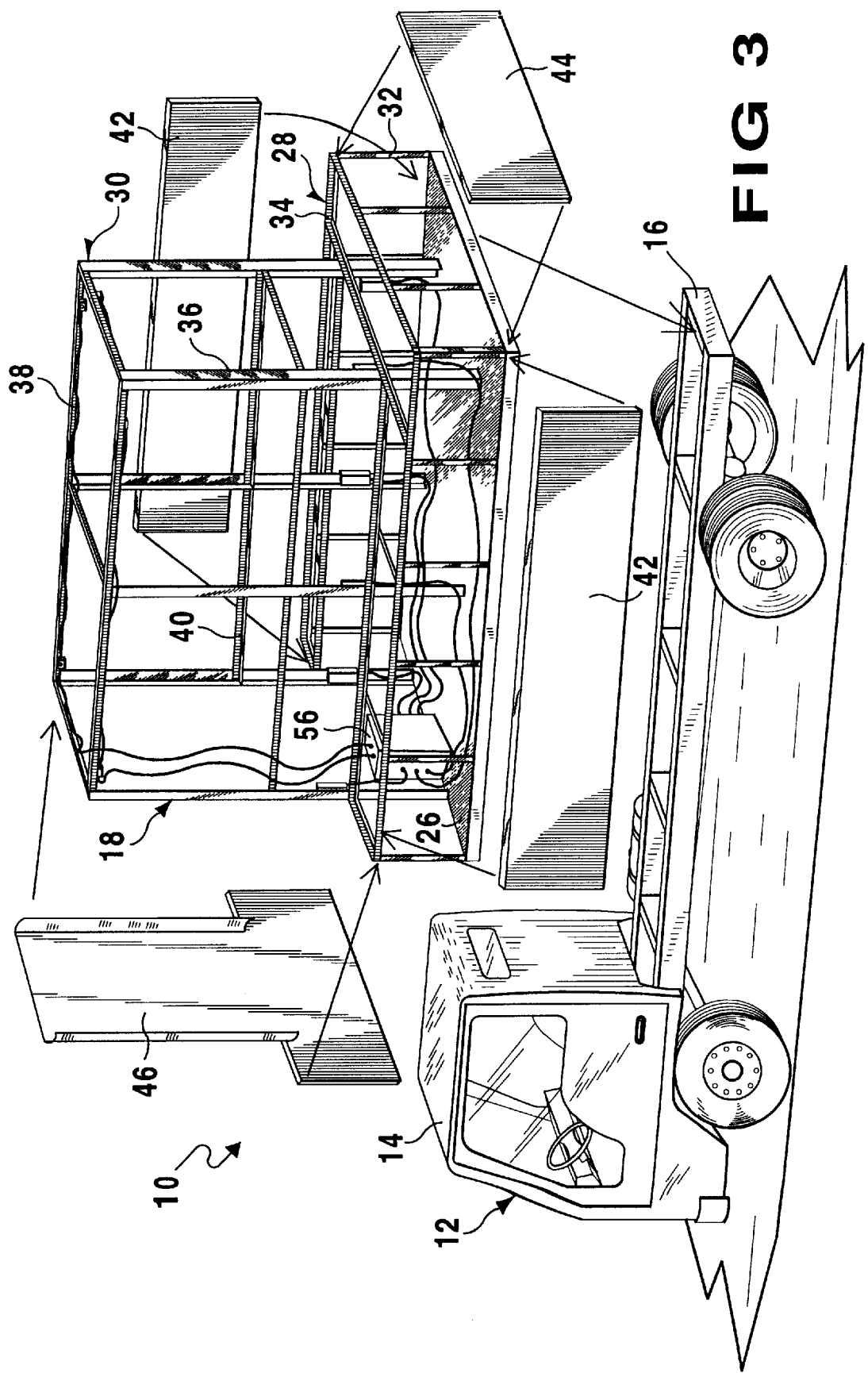
FIG. 3 is a perspective view showing the superstructure and the panels exploded from the chassis of the truck.
Figure 4:
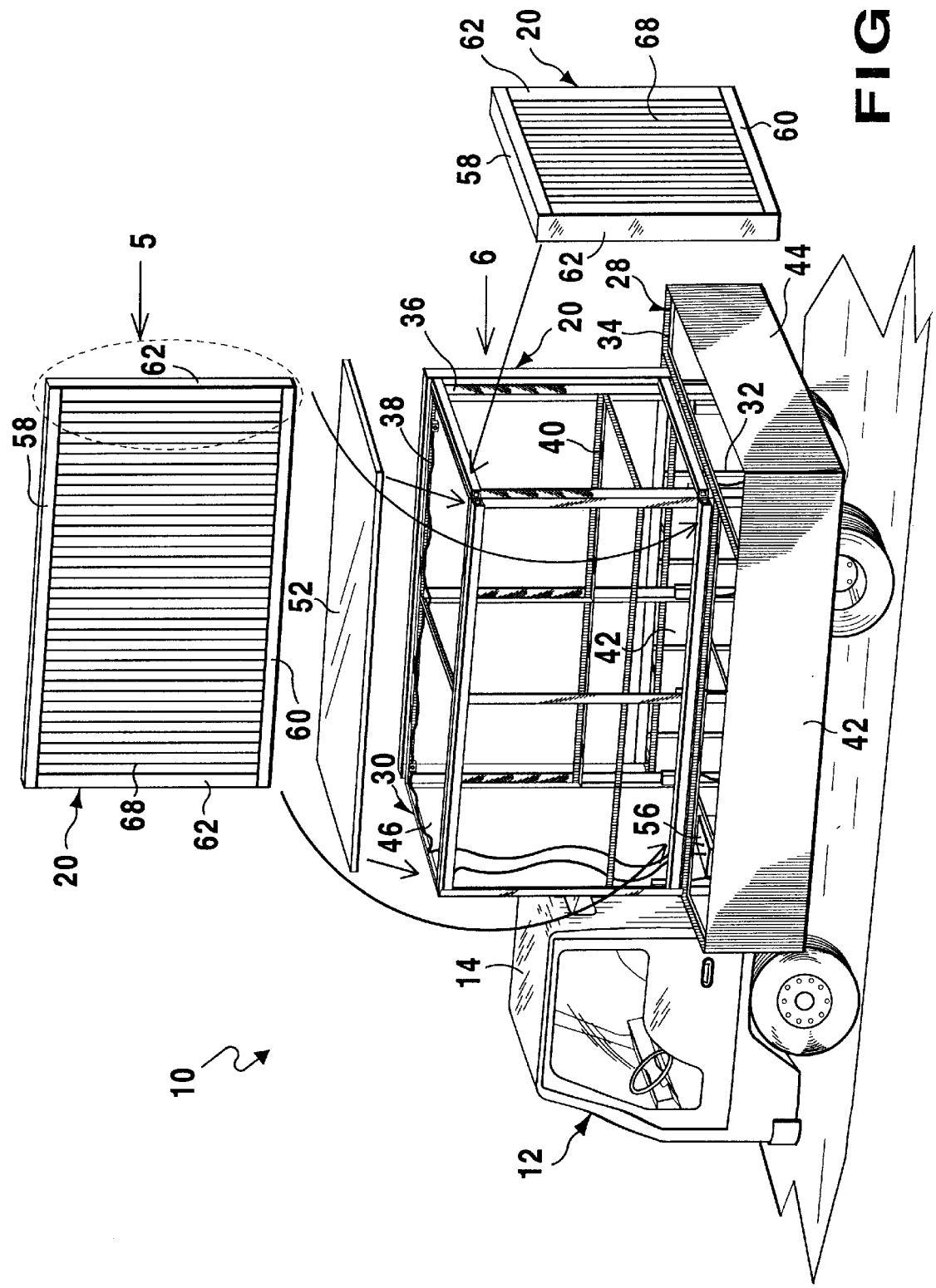
FIG. 4 is a perspective view showing one side tri-visional action display unit, the rear tri-visional action display unit and the roof exploded from the upper frame of the superstructure, which is mounted to the chassis of the truck.

Turning now descriptively to the drawings, in which similar reference characters denote similar elements throughout the several views, FIGS. 1 through 6 illustrate a mobile multi-message billboard advertising system 10, comprising a truck 12 having a wheel-supported cab 14 and chassis 16. A superstructure 18 is mounted onto the chassis 16 of the truck 12. A plurality of tri-visional action display units 20 are affixed to the superstructure 18. A facility 22 on the superstructure 18 is for illuminating the tri-visional action display units 20, so that advertisements 24 can be seen thereon.

The superstructure includes a floor 26 secured onto chassis 16 of the truck 12. A lower U-shaped frame 28 is attached to the floor 26. An upper rectangular shaped frame 30 is attached to the floor 26 The upper rectangular shaped frame 30 being narrower than the lower U-shaped frame 28, extends upwardly above the lower U-shaped frame 28. The lower U-shaped frame 28 extends about the upper rectangular shaped frame 30.

The lower U-shaped frame 28 consists of a plurality of vertical studs 32, spaced apart and affixed to the floor 26 at the perimeter of the floor. A plurality of horizontal joists 34 are spaced apart and affixed to the top ends of the vertical studs 32.

The upper rectangular shaped frame 30 comprises a plurality of vertical posts 36, spaced apart and affixed to the floor 26. A plurality of horizontal beams 38, are spaced apart and affixed to the top ends of the vertical posts 36. A plurality of horizontal struts 40, are spaced apart and affixed approximate midway to the vertical posts 36.

The superstructure 18 further includes a pair of side panels 42, attached to the sides of the lower U-shaped frame 28. A rear panel 44 is attached to the rear of the lower U-shaped frame 28. A front panel 46 is attached to the front of the lower U-shaped frame 28 and the front of the upper rectangular shaped frame 30. A top ledge 48 has a plurality of apertures 50 attached to the top of the lower U-shaped frame 28. A roof 52 is attached to the top of the upper rectangular shaped frame 30.

Two side tri-visional action display units 20 are each attached to an opposite side of the upper rectangular shaped frame 30 above the lower U-shaped frame 28. The rear tri-visional action display unit 20 is attached to the rear of the upper rectangular shaped frame 30, above the lower U-shaped frame 28.

The illuminating facility 22, as shown in FIG. 1, consists of a plurality of fluorescent lamps 54 carried in the lower U-shaped frame 18, under the top ledge 48. When the fluorescent lamps 54 are turned on, the light from the fluorescent lamps 54 will illuminate the tri-visional action display units 20 there above. An electronic panel 56 is mounted to the floor 26, to control operation of each tri-visional action display unit 20 and the fluorescent lamps 54.

Each tri-visional action display unit 20 consists of upper and lower horizontal frame members 58 and 60. A pair of vertical side frame members 62 are also provided. A plurality of vertical triangular rod prisms 64 are rotatively carried in side by side relationships between the upper and lower horizontal frame members 58 and 60.

Figure 5:
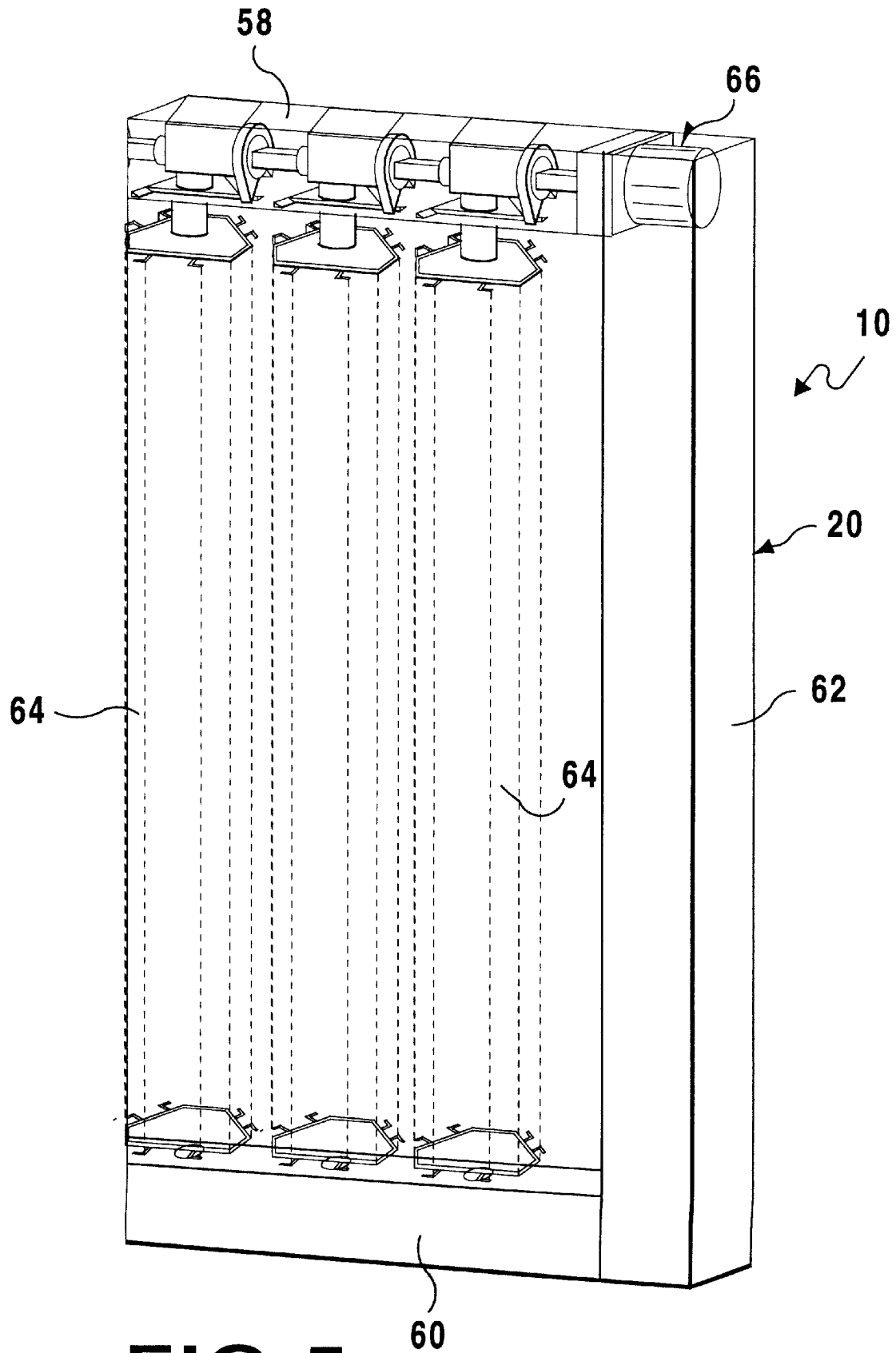
FIG. 5 is an enlarged perspective view of a portion of the side tri-visional action display unit as indicated by arrow 5 in FIG. 4.
Figure 6:
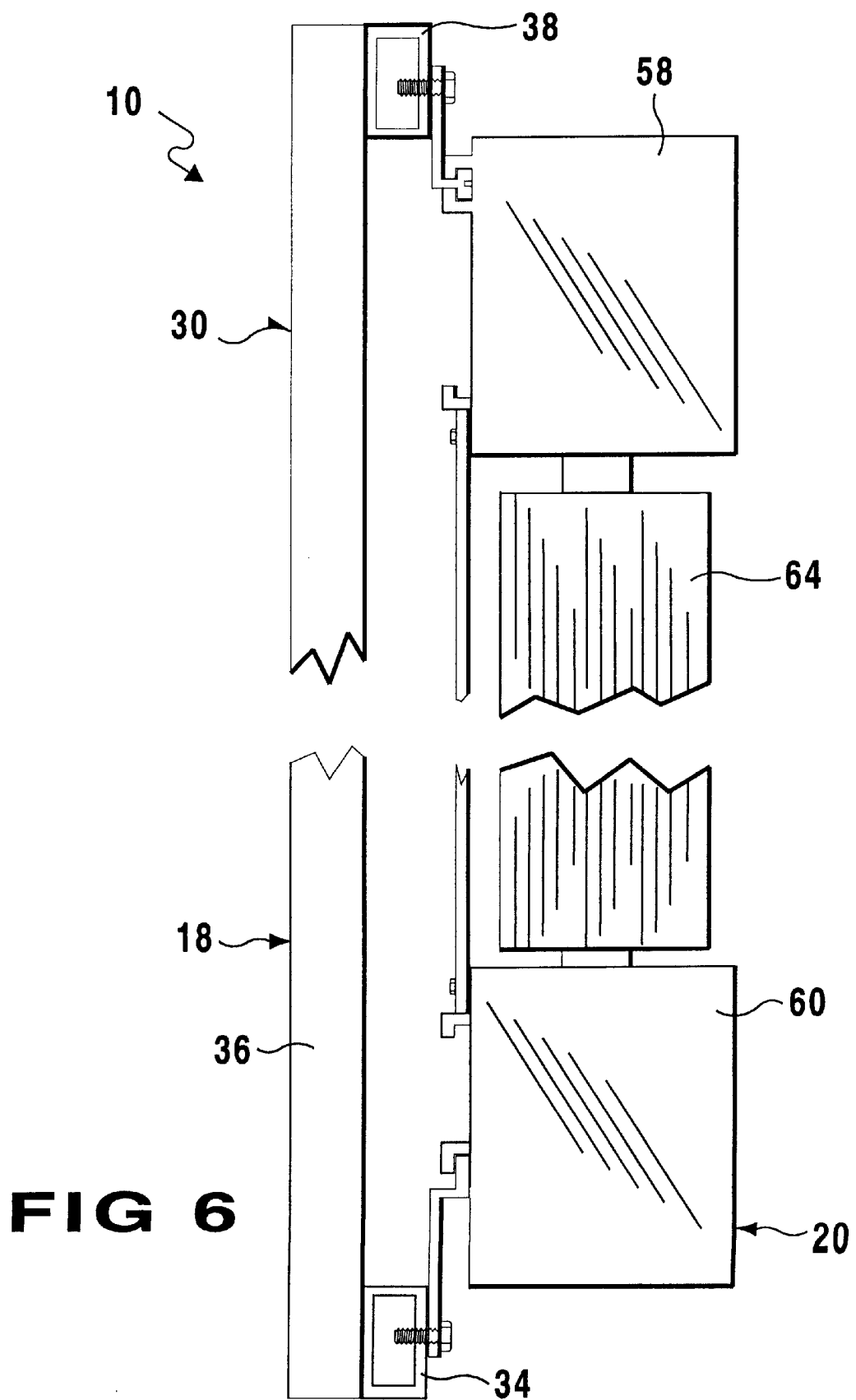
FIG. 6 is an enlarged end view with parts broken away taken in the direction of arrow 6 in FIG. 4, showing the side tri-visional action display unit mounted to the upper frame of the superstructure.

A drive mechanism 66, shown in FIG. 5, is carried in the upper horizontal frame embers 58 to rotate the vertical triangular rod prisms 64 to three stop positions. A plurality of advertising blades 68 are affixed in a removable manner (as shown by the unnumbered L-shaped members in FIG. 5 on prisms 64) to each side of each vertical triangular rod prism 64. When each vertical triangular rod prism 64 stops rotating at one of the three stop positions, the advertising blades 68 will form one complete billboard sign to be seen therefrom.

LIST OF REFERENCE NUMBERS 10 mobile multi-message billboard advertising system
12 truck of 10
14 wheel-supported cab of 12
16 wheel-supported chassis of 12
18 superstructure of 10
20 tri-visional action display unit of 10
22 illuminating facility of 10
24 advertisement on 20
26 floor of 18
28 lower U-shaped frame of 18
30 upper rectangular shaped frame of 18
32 vertical stud of 28
34 horizontal joist of 28
36 vertical post of 30
38 horizontal beam of 30
40 horizontal strut of 30
42 side panel of 18 on 28
44 rear panel of 18 on 28
46 front panel of 18 on 28 and 30
48 top ledge of 18 on 28
50 aperture in 48
52 roof of 18 on 30
54 fluorescent lamp of 22
56 electronic panel for 20 and 54
58 upper horizontal frame member of 20
60 lower horizontal frame member of 20
62 vertical side frame member of 20
64 vertical triangular rod prism of 20
66 drive mechanism of 20 for 64
68 advertising blade of 20 on 64

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A mobile multi-message billboard advertising system comprising:

a) a truck having a wheel-supported cab and chassis:

b) a superstructure mounted onto said chassis of said truck comprising a floor secured to said chassis, a lower U-shaped frame in plan view attached to and extending up from said floor, and an upper rectangular shaped frame attached to said floor, whereby said upper rectangular shaped frame is narrower than said lower U-shaped frame with said lower U-shaped frame extending about said upper rectangular shaped frame, said lower U-shaped frame including a plurality of vertical studs spaced apart and affixed to said floor at the perimeter of said floor and a plurality of horizontal joists spaced apart and affixed to the top ends of said vertical studs, and said upper rectangular shaped frame includes a plurality of vertical posts spaced apart and affixed to said floor, a plurality of horizontal beams spaced apart and affixed to the top ends of said vertical posts, and a plurality of horizontal struts spaced apart and affixed approximately midway to said vertical posts, said superstructure further including a pair of side panels attached to sides of said lower U-shaped frame, a rear panel attached to rear of said lower U-shaped frame, a front panel attached to front of said lower U-shaped frame and said upper rectangular shaped frame, a top ledge having a plurality of apertures attached to top of said lower U-shaped frame, and a roof attached to top of said upper rectangular shaped frame;

c) a pair of tri-visional action display units affixed to opposite sides of said upper rectangular shaped frame above said lower U-shaped frame and a rear tri-visional action display unit attached to the rear of said upper rectangular shaped frame above said lower U-Shaped frame;

d) means on said superstructure, for illuminating said tri-visional action display units including a plurality of fluorescent lamps carried in said lower U-shaped frame under said top ledge, so that advertisements can be seen thereon, and an electronic panel mounted on said floor to control operation of each said side and rear tri-visional action display unit and said fluorescent lamps;

e) each tri-visional action display unit comprising upper and lower horizontal frame members, a pair of vertical side frame members, a plurality of vertical substantially triangular rod prisms rotatively carried in side by side relationships between said upper and lower horizontal frame members, a drive mechanism carried in said upper horizontal frame member to rotate said prisms together to three stop positions, and a plurality of advertising blades removably affixed to the sides of each said prism so that when all said prisms stop rotating at the same time at one of the three stop positions said advertising blades form one complete billboard sign to be seen therefrom; and f) each substantially triangular prism having their three vertical edges cut off with a flat surface so that the vertical sides of said prisms are effectively spaced from each other.

* * * * *